Jack H. Blumenthal, Oakhurst, N.J., assignor to International Flavors & Fragrances Inc., New York, N.Y.
Continuation-in-part of application Ser. No. 667,398, Sept. 13, 1967. This application Aug. 13, 1968, Ser. No. 752,145
Int. Cl. C07c 49/43, 49/45
U.S. Cl. 260—586 A      16 Claims

ABSTRACT OF THE DISCLOSURE

Fragrance materials prepared by acylation of trimethyl cyclododecatriene, dihydro and tetrahydro derivatives thereof, processes for producing same, and purfume compositions containing such materials.

---

This application is a continuation-in-part of copending application Ser. No. 667,398, filed Sept. 13, 1967, now abandoned.

BACKGROUND OF THE INVENTION

The constantly increasing demand for perfumes and perfume materials has in many instances severely strained the natural sources of supply. There is accordingly an increasing need for suitable materials which can be prepared from commercially available materials and which will provide fragrance notes which are desirable in perfume compositions. There is also a continuing need for stable materials which can be incorporated into perfumed products, such as soaps, shampoo, cosmetic preparations and the like.

THE INVENTION

The invention comprises the novel compositions and component mixtures comprised in such compositions, as well as the novel processes and steps of processes according to which such compositions may be manufactured, specific embodiments of which are described hereinafter by way of example only and in accordance with what is now considered the preferred manner of practicing the invention.

Briefly, the perfume materials of this invention are ketones produced by acylating trialkyl cyclododecenes and recovering the acylated product. The products produced by these processes are suitable for incorporation into a wide variety of perfume and fragrance-modifying compositions, and such perfume and fragrance-modifying compositions are also contemplated herein.

It has been found that the novel materials of this invention have a persistent fragrance, as more fully described below, which particularly adapts them for incorporation into perfume compositions and fragrance-modifying compositions having a desirable woody-amber fragrance note. It will be appreciated by those skilled in the art from the present disclosure that the fragrance character can be varied according to the reaction conditions and the subsequent treatment of the materials produced in the reaction.

The present invention is further illustrated by the accompanying drawings wherein.

The cyclic hydrocarbons treated according to this invention are trialkyl-substituted cyclododecenes, preferably such cyclododecenes having from one to three unsaturated carbon-to-carbon bonds. The lower alkyl groups having from one to three carbon atoms are contemplated, and the preferred alkyl substituent is methyl. The substances produced by trimerizing such methyl butadienes as isoprene, piperylene (1,3-pentadiene) or mixtures of isoprene and piperylene to obtain cyclic derivatives are a convenient source of such materials. Thus, cyclododecenes for use in the practice of this invention include 1,5,9-trimethyl cyclododecatriene-1,5,9; 1,5,9-trimethyl cyclododecatriene-1,5,10; and other such trimethyl cyclododecatrienes.

Mono- and di- and trienoic cyclododecenes can be used, and it will be appreciated that, when the starting material is the triene obtained from the trimerization of polyenoic hydrocarbons, the mono- and di- unsaturated materials can be obtained by hydrogenating the triene. The acylated cyclododecene produced according to this invention can also be hydrogenated if a lower degree of unsaturation is desired. The cyclododecene starting material is generally a mixture of various cis-trans isomers, and the several isomers have been found satisfactory in the practice of this invention.

It has been found that better results are obtained when the cyclododecene is of at least 90% purity. When a relatively crude material is used, it can be purified to the desired degree by convention techniques such as distillation, extraction, and the like. It will be understood that the positions of the alkyl substituents on, and the positions of the double bonds in, the cyclododecene ring can vary according to the starting material and mode of preparation of the cyclododecene.

The acylating agent used in the practice of the invention can be any material capable of adding the desired acyl group to the ring. Carboxylic acid anhydrides, such as propionic and butyric anhydrides, are desirable acylating agents. A preferred acylating agent in the present invention is acetic anhydride. Acylating agents such as acyl halides, as for example, acetyl chloride may be used. Still other equivalent materials will readily occur to those skilled in the art.

The acylation can be carried out in the presence of a solvent or other vehicle. The vehicle, if used, can be a liquid which is inert to the reactants, catalyst (as disclosed further below), and any other modifying materials present in the reaction mass. Thus, hydrocarbons and chlorinated hydrocarbons are useful as vehicles in the invention. The hydrocarbons and chlorinated hydrocarbons are preferably saturated. Methylene chloride is a desirable vehicle in the practice of the invention.

The acylation can be carried out with an excess of acetic anhydride which performs the function of a vehicle in the reaction mass, although a substantial excess of the anhydride may cause a high degree of polyacylation. In order to minimize such polyacylation, an excess of the trialkyl cyclododecene can be used in the reaction mixture.

The reaction is preferably carried out in the presence of an acidic catalyst. It has been found that Friedel-Crafts acylation agents are especially desirable as catalysts. Thus, boron trifluoride, stannic chloride, ferric chloride, and zinc chloride are preferred catalysts. It will be understood that materials providing such catalysts under the reaction conditions can be used. For example, boron trifluoride-ether complex or boron trifluoride-acetic acid complex can be used.

When a strong Friedel-Crafts acylation agent is used as a catalyst, a lower reaction temperature is desirable to facilitate control of the reaction velocity. When weaker Friedel-Crafts materials are used, a higher temperature is convenient and desirable to achieve a conveniently rapid rapid reaction rate. The reaction is accordingly carried out at a temperatures ranging from below about $-5°$ C. to about $100°$ C., and the range of from about $-5°$ C. to about $70°$ C. is preferred. Thus, with boron trifluoride an ice bath at $0°$ C. can be used, and with stannic or ferric chloride temperatures on the order of $10°$ C.–$50°$ C. are desirable. Zinc chloride gives good results at temperatures of about $70°$ C.

The concentration of the catalyst can be varied from catalytic amounts, i.e., one or two percent of the cyclododecenes, up to molar amounts. Stronger catalysts such as boron trifluoride can be used in lower concentrations, whereas it is generally advantageous to use higher concentrations of the weaker catalysts such as zinc chloride.

The times required will vary with the temperatures, concentrations of reactants and catalysts, and the particular reactants and catalyst used. The times utilized in the reaction vary from that sufficient to obtain a homogeneous mixture of the reaction mass to several hours, although this can be varied even more widely by controlling the reaction temperature, reaction materials, vehicles, and catalysts, as disclosed above. Thus, times preferably range from about one-half hour to about ten hours.

The reaction can be carried out at sub- or superatmospheric pressure. This will vary according to the added vehicle, if any, contained in the reaction mixture, the acylating agent, and the temperature, and it is generally preferred that the reaction be carried out at substantially atmospheric pressure.

After the reaction has been completed or carried out to the extent desired, the acylated product is separated from the reaction mass. A preferred step in purification is removal of catalyst from the system by means of treatment with a suitable basic material. The basic material can either be a relatively strong one such as sodium hydroxide, or it can be a relatively weaker one, for example, the salt of a strong base and weaker acid, such as sodium carbonate, sodium acetate, and the like.

After catalyst removal, as described above, the reaction mass can be extracted to concentrate the desired products and/or it can be distilled. The partially purified material in a preferred aspect of the invention is then further purified by fractional distillation. If desired, other or further purification can be carried out by preparative chromatographic techniques.

As noted above, the reaction mass contains a number of materials, and it is preferred to purify it prior to use in fragrance, perfume, and fragrance-modifying compositions. For many purposes it is desirable to have more highly purified materials which are substantially single substances or a mixture of closely related materials.

Efficacious materials according to the present invention include monocyclic alkyl ketones having the formula wherein $R_1$ is a lower alkyl having up to six carbon atoms and is preferably methyl or ethyl, $R_2$ is methyl or methylene, and $R_3$ and $R_4$ are nonadjacent methyl groups, said ketone having from zero to three non-conjugated carbon-carbon double bonds. Two double bonds, when present, are not on the same carbon atom, so such bonds are non-allenic. In certain preferred embodiments of the present invention, the monocyclic alkyl ketones have the structural formula:

wherein the dashed line is a single or a double bond and no more than one of the wavy lines is a double bond.

In the foregoing formula, A represents $R_1$ represents a lower alkyl having up to about 6 carbon atoms and is preferably methyl or ethyl. In the formula for A given above, one carbon-to-carbon double bond is present so that no more than one of the dashed lines represents a carbon-to-carbon double bond, and the other two represent single bonds. Accordingly, in the formula given above A, $m$ is 0 or 1, $n$ is 1 or 2, $p$ is 2 or 3, and $m+n+p$ equals 5. It will be understood that the structural formulas herein represent cis and trans isomers of the novel ketones, as well as stereoisomers.

Figure 1:
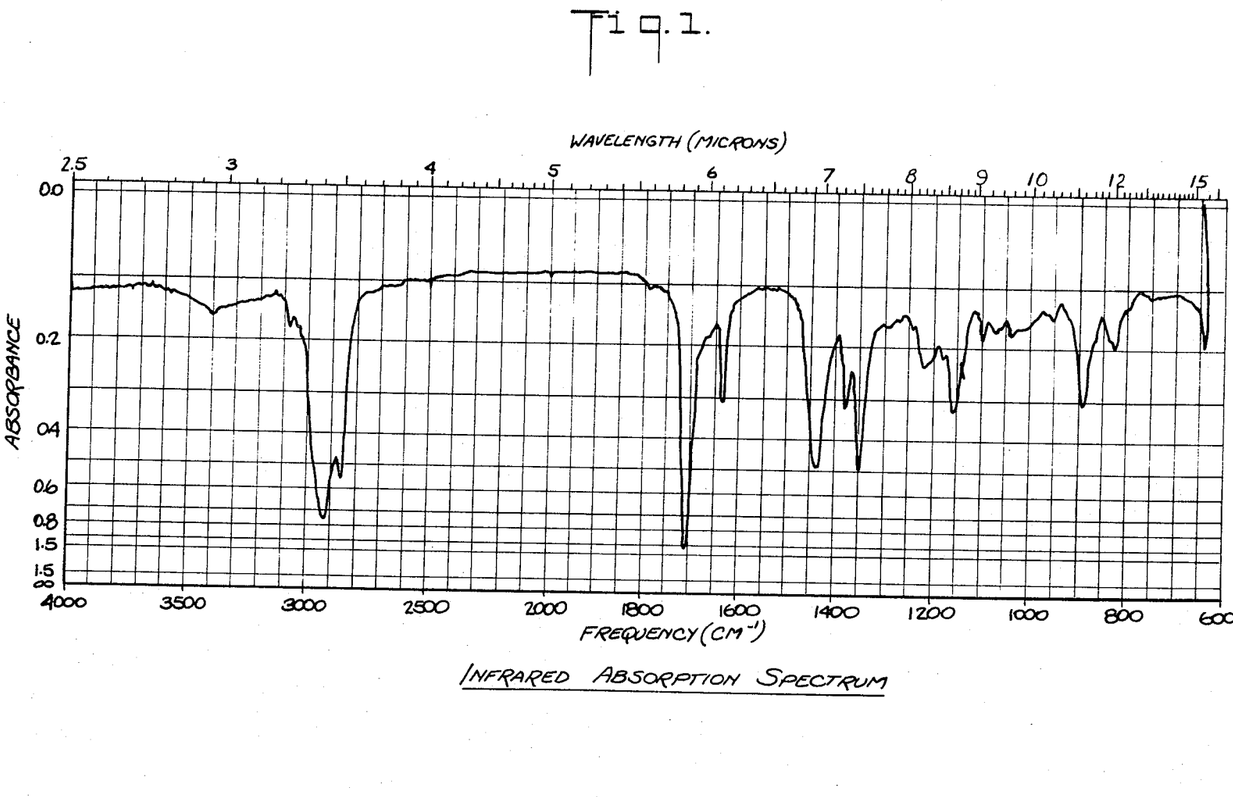
FIG. 1 is an infrared absorption (IR) spectrum of a novel acylated ketonic material and FIG. 2 is a nuclear magnetic resonance (NMR) spectrum of the same material.
Figure 2:
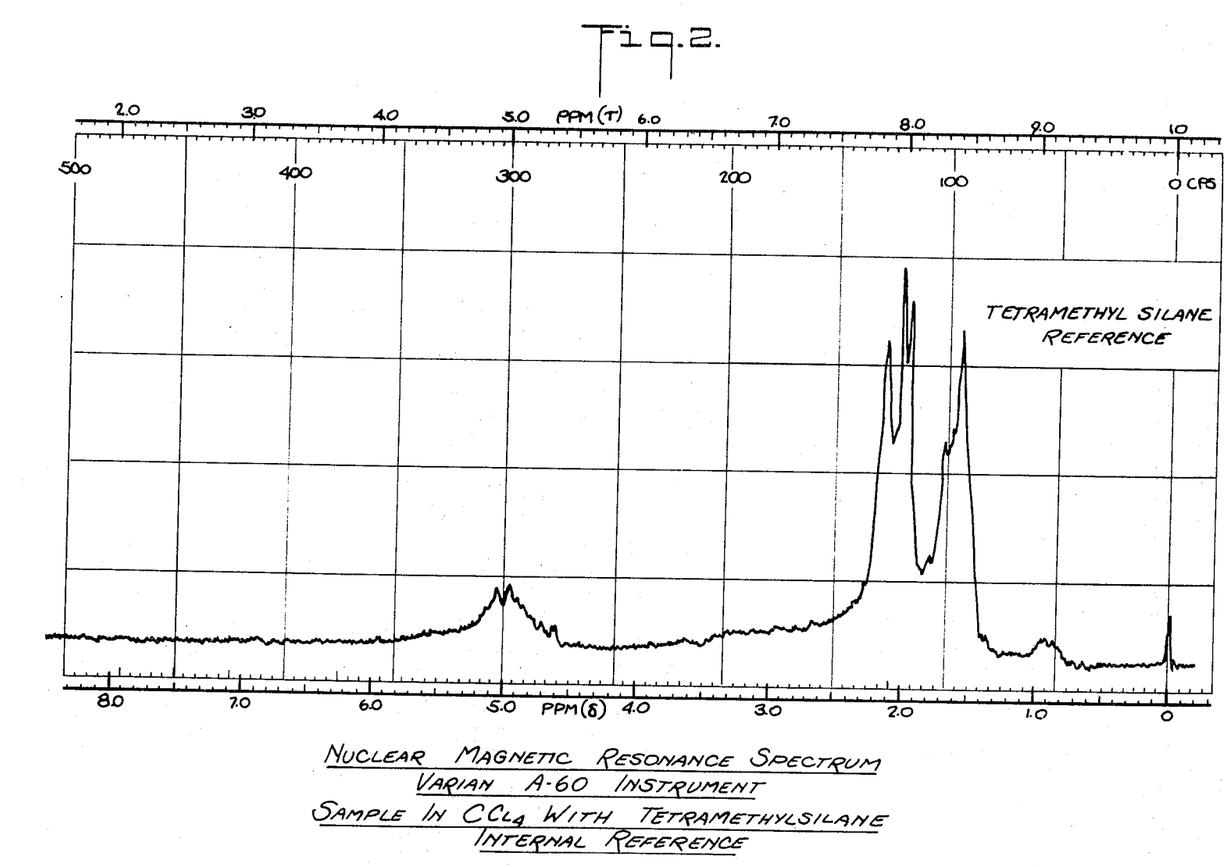

In one aspect of the present invention materials represented by the following structural formula are obtained:

This liquid has a camphor woody-amber fragrance note. According to mass spectroscopy, the liquid has a molecular weight of 246 (parent ion peak), a base peak m/e of 43 for m/e ratios for singly ionized fragments of 43, 41, 39, 55, 81, 53, 42, 59, 137, and 95. Its IR spectrum as obtained undiluted on a Perkin-Elmer Model 621 grating spectrometer is shown in FIG. 1, and its NMR spectrum as obtained at 60 mHz. on a Varian Model A–60 instrument in carbon tetrachloride at ambient temperature (about $25°$ C.) against a tetramethylsilane internal reference is shown in FIG. 2. The IR spectrum shows a C=O band at 1708 cm.$^{-1}$, bands at 1660 and 830 cm.$^{-1}$, and a band at 1350 cm.$^{-1}$. The NMR spectrum shows

| Assignment | Chemical shift (p.p.m.) | No. of protons |
|---|---|---|
| C=H | 5.00 (multiplet) | 3 (3.1) |
| $\begin{matrix}\diagdown\\\diagup\end{matrix}$C–$\overset{H}{\underset{}{C}}$–C=O $\begin{matrix}\diagdown\\\diagup\end{matrix}$C–CH$_2$–C= | 3.00–2.59 (multiplet) | 3 (2.8) |
| $\begin{matrix}\diagdown\\\diagup\end{matrix}$C–CH$_2$– CH$_3$–C=O | 2.17, 2.00 (broad singlets) 1.97 (singlet) | 9 (9.3) |
| $\begin{matrix}\diagdown\\\diagup\end{matrix}$C–CH$_3$ $\diagdown$CH$_3$ | 1.67–1.41 | 11 (10.9) |

Closely related materials found in admixture with the foregoing mixture are represented by the structural formula The trimethyl acylate can be hydrogenated to reduce one, two, or three of the double bonds. Exemplary structural formulas for the dihydro (monohydrogenated) acylates are and The woody-amber odor of this liquid is similar to that of the unhydrogenated acylates described above, and the IR spectrum is as shown in FIG. 3. The spectrum shows a >C=O band at 1710 cm.$^{-1}$, a band at 1755 cm.$^{-1}$, and

Figure 3:
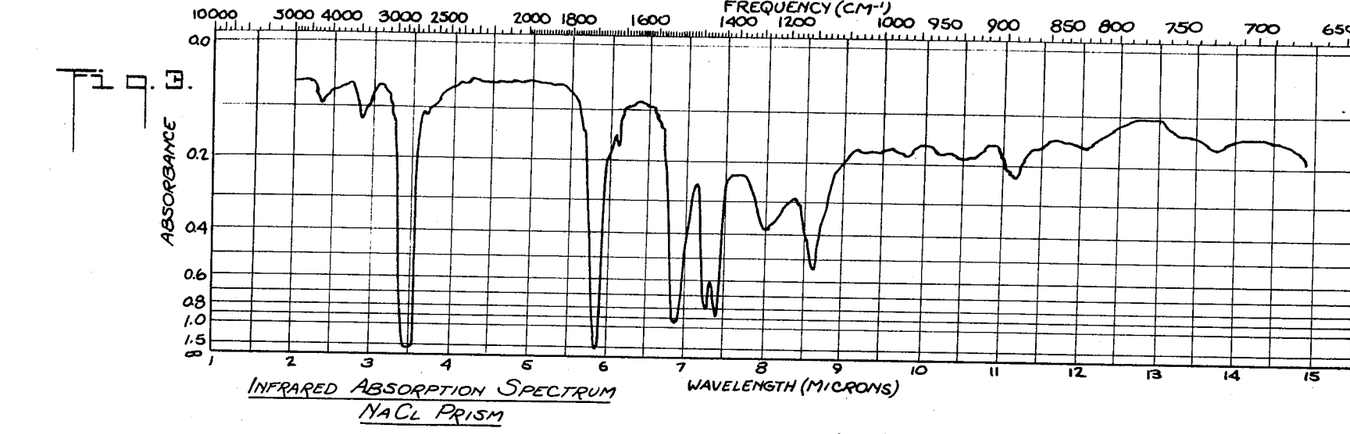
FIGS. 3, 4, 5, 7 and 8 are IR spectra of hydrogenated materials according to this invention.

>C=C— with H bands at 1670 and 830 cm.$^{-1}$.

Figure 7:
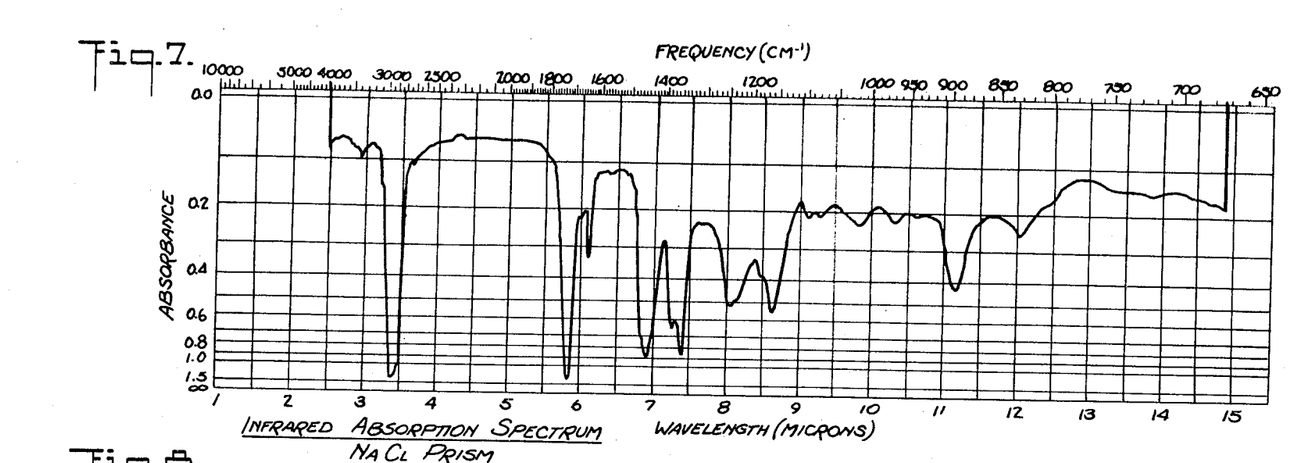

Similar dihydro acylates can be prepared by initially monohydrogenating the hydrocarbon, trimethyl cyclododecatriene, and then acylating the hydrogenated material in accordance with the acylation procedure described above. Examples of the dihydro acylates thus produced are:

The woody amber odor of this liquid is similar to that of the monohydrogenated acylate described above, and the IR spectrum as obtained on a Perkin-Elmer Model 21 instrument is shown in FIG. 7. The spectrum shows a >C=O band at 1712 cm.$^{-1}$, a band at 1755 cm.$^{-1}$,

>C=C— with H bands at 1670 and 832 cm.$^{-1}$, and =CH$_2$ bands at 3080, 1645 and 895 cm.$^{-1}$.

The tetrahydro acylate is obtained either directly by hydrogenation of the acylate or by hydrogenation of the dihydro acylate (formed by hydrogenating the acylate.) The tetrahydro acylates thus formed are represented by the following structures This liquid has a shaded camphor woody-amber fragrance note and the IR spectrum shown in FIG. 4. This IR spectrum discloses a >C=O band at 1710 cm.$^{-1}$, a band at 1755 cm.$^{-1}$, and

Figure 4:
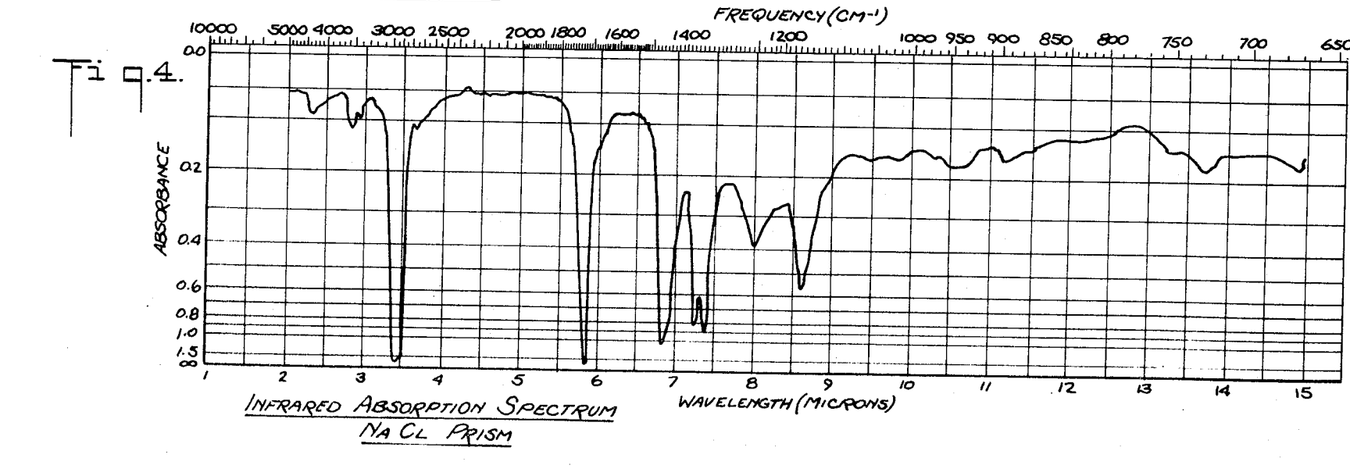

>C=C— with H bands at 1670 and 830 cm.$^{-1}$.

Figure 8:
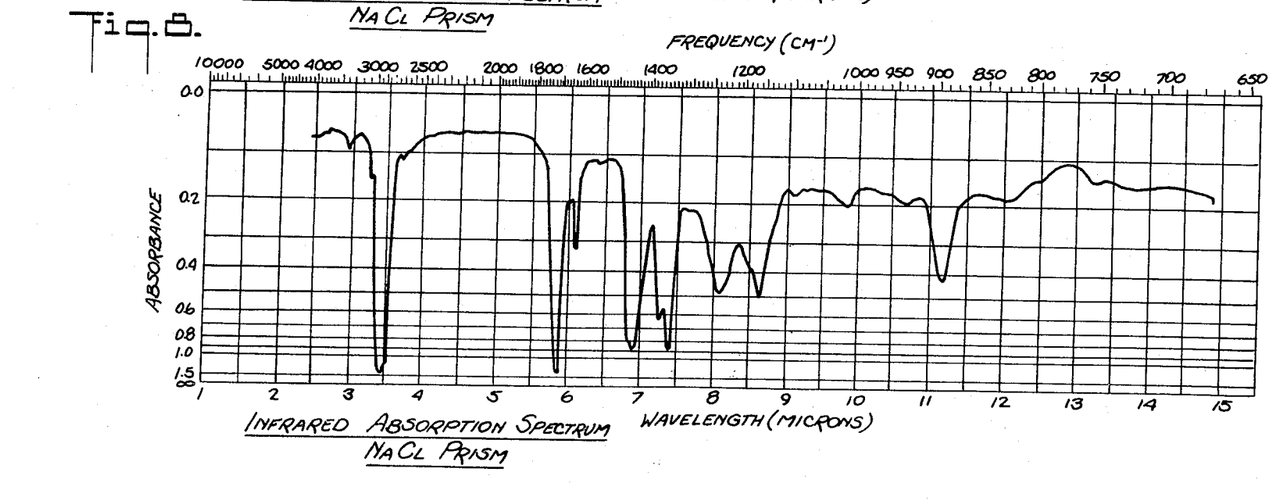

Similar tetrahydro acylates can be prepared by initially dihydrogenating the hydrocarbon and then acylating in accordance with the acylation procedure described hereinabove. Examples of the tetrahydro acylates thus produced are:

The woody, amber odor of this liquid is similar to that of the dihydrogenated acylate described above, and the IR spectrum as obtained on a Perkin-Elmer Model 21 instrument is shown in FIG. 8. This spectrum shows a >C=O band at 1712 cm.$^{-1}$, a band at 1755 cm.$^{-1}$, bands at 1670 and 832 cm.$^{-1}$, and =CH$_2$ bands at 3080, 1645, and 895 cm.$^{-1}$.

Further hydrogenation of the carbon-to-carbon double bond of the tetrahydro material or complete hydrogenation of the carbon-to-carbon unsaturation in the original acylate provides hexahydro acylates having the structural formula

Figure 5:
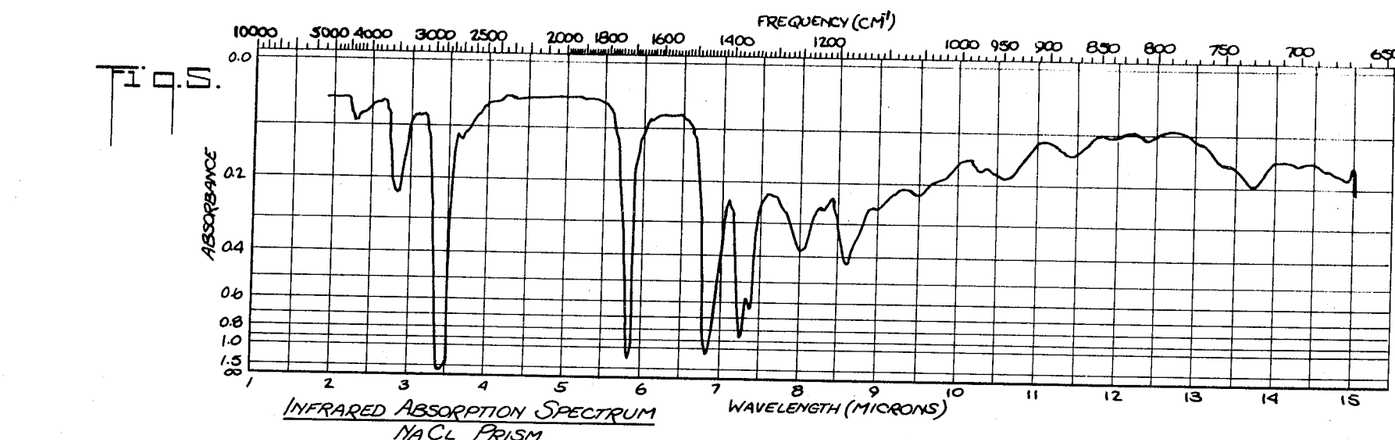

The hydrogenated liquid has a shaded woody-amber fragrance and the IR spectrum depicted in FIG. 5. This spectrum shows a >C=O band at 1710 cm.$^{-1}$ and a band at 1755 cm.$^{-1}$.

Hydrogenation to prepare the dihydro, tetrahydro, and hexahydro acylates is carried out by adding the desired number of moles of hydrogen under pressure in the presence of a hydrogenation catalyst. Pressures ranging from atmospheric up to about 500 p.s.i.g. can be used, and good results have been obtained at pressures of about 250 p.s.i.g. Temperatures ranging from about 50° C. to 100° C. or more are satisfactory. Catalysts such as Raney nickel, palladium on carbon and the like have given good results.

When propionic anhydride is utilized to acylate the cyclododecene and the reaction mass is purified as disclosed above, acylated cyclododecenes having the following structures are obtained:

This is a liquid having a woody-amber fragrance note and exhibiting IR absorption bands for >C=O at 1710 cm.$^{-1}$, at 1670 and 828 cm.$^{-1}$, at 1112 cm.$^{-1}$, and =CH$_2$ at 3080, 1645 and 890 cm.$^{-1}$. This material can be hydrogenated as disclosed above or isomerized as disclosed hereinafter.

A conjugated ketone can be produced from the acylate by treatment of the latter with an isomerization agent such as an alcoholic alkali-metal alkanoate under anhydrous conditions. For example, the reaction can be carried out with sodium methylate in anhydrous methanol. The reaction is generally carried out at temperatures of about 70° C.

Figure 6:
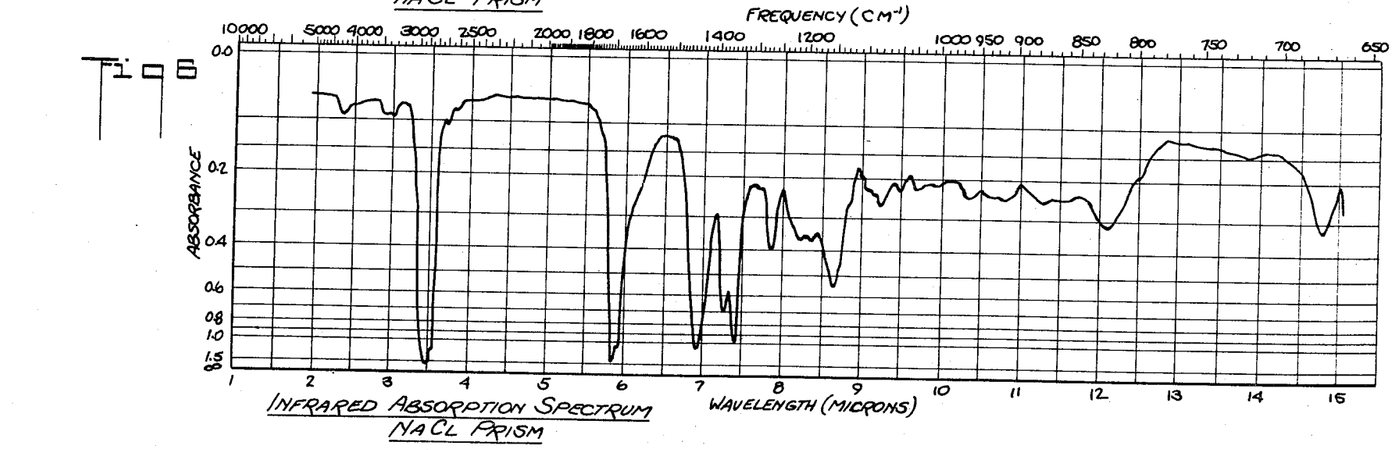
FIG. 6 is an IR spectrum of a novel isomerized material.

Thus, treatment of the acrylate prepared with acetic anhydride will provide an isomerized mixture of materials having a boiling point of 117–123° C. at 0.6 mm. Hg and one component of which is represented by the following structural formula:

This liquid has a pronounced camphoraceous woody-amber fragrance note and the IR spectrum shown in FIG. 6, the spectrum being obtained on a Perkin-Elmer Model 21 instrument. This spectrum shows bands for >C=O at 1710 cm.$^{-1}$, at 1350 cm.$^{-1}$, at 830 cm.$^{-1}$, and conjugated >C=O at 1690 cm.$^{-1}$. This material can be hydrogenated with one, two or three moles of hydrogen in accordance with the foregoing procedures to yield the dihydro, tetrahydro, or hexahydro derivatives.

Acylation of the trimethyl cyclododecatriene derived by trimerizing a mixture of isoprene and piperylene provides a product boiling at 84–93° C. at 1.4 mm. Hg which comprises a component having the structural formula:

and a component having the structural formula:

This liquid has a camphoraceous fragrance note.

The purified materials described above are olfactory agents and can be incorporated into a wide variety of compositions which will be enhanced by the woody fragrance note of the trialkyl cyclododecene acylate. It has been found that the products of this invention are especially desirable due to their persistence which, in many cases, lasts for periods of weeks under actual use conditions. The materials produced according to this invention can be added to perfume compositions in their pure form or as mixtures of materials in fragrance-imparting compositions to give a desired fragrance character to a finished perfume material. The perfume and fragrance compositions of this invention are suitable in a wide variety of perfumed materials and can be also used to enhance, modify, or reinforce natural fragrance materials.

Thus, the acylated cyclic materials of this invention are useful as olfactory agents and fragrances. As disclosed above, the products may be employed in admixture with their isomers as obtained from the reaction mixture or the individual components may be employed alone. The acylated materials contribute a camphoraceous woody-amber odor.

The term "perfume composition" is used herein to mean a mixture of compounds, including, for example, natural oils, synthetic oils, alcohols, aldehydes, ketones, esters, lactones, and frequently hydrocarbons which are admixed so that the combined odors of the individual components produce a pleasant or desired fragrance. Such perfume compositions usually contain: (a) the main note or the "bouquet" or foundation-stone of the composition; (b) modifiers which round-off and accompany the main note; (c) fixatives which include odorous substances which lend a particular note to the perfume throughout all stages of evaporation, and substances which retard evaporation; and (d) top-notes which are usually low-boiling fresh-smelling materials. Such perfume compositions or the novel materials of this invention can be used in conjunction with carriers, vehicles, solvents, dispersants, emulsifiers, surface-active agents, aerosol propellants, and the like.

In perfume compositions the individual components contribute their particular olfactory characteristics, but the overall effect of the perfume composition will be the sum of the effect of each ingredient. Thus, the individual compounds of this invention, or mixtures thereof may be used to alter the aroma characteristics of a perfume composition, for example, by highlighting or moderating the olfactory reaction contributed by another ingredient in the composition.

The amount of mixtures or compounds of this invention which will be effective in perfume compositions depends on many factors, including the other ingredients, their amounts and the effects which are desired. It has been found that perfume compositions containing as little as 3.0% by weight of mixtures or compounds of this invention, or even less can be used to impart a woody-amber odor to soaps, cosmetics and other products. The amount employed will depend on considerations of cost, nature of the end product, the effect desired in the finished product, and the particular fragrance sought.

The materials disclosed herein can be used alone, in a frangrance-modifying composition, or in a perfume composition as olfactory components in detergents and soaps; space deodorants; perfumes; colognes; bath preparations such as bath oil, bath salts; hair preparations such as lacquers, brilliantines, pomades, and shampoos; cosmetic preparations such as creams, deodorants, hand lotions, sun screens; powders such as talcs, dusting powders, face powder, and the like.

The following examples serve to illustrate embodiments of the invention as it is now preferred to practice it. It will be understood that these examples are illustrative and the invention is to be considered restricted thereto only as indicated in the appended claims.

EXAMPLE I

Into a 5-liter reaction flask equipped with a stirrer, thermometer, reflux condenser, addition funnel and drying tube are charged the following materials:

1250 ml. acetic anhydride
1550 ml. $BF_3$-etherate
500 g. 1,5,9-trimethyl cyclododecatriene-1,5,9, as described below.

The flask is charged initially with acetic anhydride and $BF_3$-etherate and then cooled to 0° C. At 0° C., the trimethyl cyclododecatriene is added. The reaction mass is stirred and made homogeneous, and is then poured onto 4000 g. of ice. Thereafter, sodium hydroxide (5% aqueous) is added to neutralize the mass. The two resulting phases are separated, and the aqueous phase is extracted with benzene. The benzene extract is bulked with the main organic phase, and the bezene solvent is then stripped off. The weight of the resulting oil is 645 g. The oil is then distilled. The ketonic product thus obtained has a boiling range of 180–210° C. at 2 mm. Hg and a persistent woody-amber fragrance.

EXAMPLE II

Into a 500-ml. reaction flask equipped with a stirrer, thermometer, reflux condenser and addition funnel are added the following:

100 g. methylene chloride ($CH_2Cl_2$)
100 g. 1,5,9-trimethyl cyclododecatriene-1,5,9
10 g. stannic chloride
60 g. acetic anhydride The methylene chloride and trimethyl cyclododecatriene are initially placed into the flask. Then the stannic chloride is added at temperatures between 25 and 30° C. Immediately subsequent to the stannic chloride addition, acetic anhydride is added at temperatures between 20 and 30° C. The reaction is then allowed to proceed for a period of two hours between temperatures of 22 and 28° C.

At the end of the two-hour period, the reaction mass is worked-up. One hundred ml. benzene is added to the mass, and the mass is then washed with one volume of sodium chloride solution, whereupon two phases are formed. The organic phase is separated and washed with one volume of 5% sodium bicarbonate and then with one volume of 10% sodium chloride solution. The benzene is stripped out of the organic phase. The net weight of the resulting ketonic product prior to distillation is 83.0 g.

After distillation, the preferred material has a boiling point of 126–134° C. at 1 mm. Hg and a persistent woody-amber fragrance note.

EXAMPLE III

A 3-liter reaction flask is charged with 800 g. of 1,5,9-trimethyl cyclododecatriene-1,5,9 and the mass is cooled to 0° C. with good stirring. A previously prepared solution of 563 g. of $BF_3$-etherate and 457 g. of acetic anhydride is added at 0° to 5° C. over a period of 30 minutes. The mass is stirred for another 30 minutes at 0° to 5° C. and is then poured onto 1500 g. of an ice-water mixture containing 200 ml. toluene. The separated oil layer is washed consecutively with equal volumes of water, 5% NaOH, and water and the solvent stripped off.

The residual oil weighs 908 g. Fractionation yields 240 g. of recovered hydrocarbon and 175 g. of product testing 93.3% as $C_{17}$ ketone by oximation and having a boiling point of 147–166° C. at 2,5 mm. Hg, a woody-amber fragrance, the IR and NMR spectra of FIG. 1 and 2, respectively, a molecular weight of 246 (confirmed by mass spectrometry on a GLC trapped sample) and singly ionized fragments having m/e ratios of 43, 41, 39, 55, 81, 53, 42, 59, 95, and 137.

EXAMPLE IV

A two-liter reaction flask equipped with a stirrer, thermometer, addition funnel, reflux condenser, and drying tube is charged with the following materials:

900 g. of trimethyl cyclododecatriene
180 g. of acetic anhydride

With stirring and cooling to maintain the temperature at 25° C. is added a solution of 10 grams of $BF_3$-etherate and 180 g. acetic anhydride over a period of 20 minutes. The mixture is stirred at room temperature for another three hours, after which 100 ml. of toluene and 500 ml. of water are added.

The organic layer is separated and washed once with 300 ml. of 5% NaOH and then with 300 ml. of salt solution. The solvent is stripped off to yield 946 g. of crude product. Fractionation gives 486 g. of recovered starting trimethyl cyclododecatriene and 243 g. of acylated product (ketone) having a boiling range of 118–126° C. at 1 mm. Hg. The yield is 59% by weight (based on trimethyl cyclododecatriene utilized in the reaction). The ketone has a woody-amber fragrance note.

EXAMPLE V

A two-liter reaction flask equipped with a stirrer, thermometer, reflux condenser, addition funnel and drying tube is charged with 900 g. of trimethyl cyclododecatriene, 250 g. of acetic anhydride, and 45 g. of zinc chloride. The reaction mixture is stirred and heated at 70° C. for one hour and then is poured into 1100 ml. of water and 100 ml. of toluene. The oil layer is separated and the aqueous layer extracted with toluene. The combined organic material is washed with 100 ml. of 5% aqueous sodium hydroxide solution and then with water, and the solvent stripped off to obtain 829 g. of crude product. Fractionation gives 542 g. of recovered trimethyl cyclododecatriene and 223 g. of ketonic acylated product having a woody-amber fragrance note.

EXAMPLE VI

To a mixture of 900 g. of trimethyl cyclododecatriene and 500 g. of propionic anhydride, cooled to 10° C., is added dropwise 25 g. of stannic chloride over a period of one hour while maintaining the temperature at 18–20° C. The mixture is stirred for another two hours at 20–25° C. after the addition is completed and then is worked up as in Example IV.

The crude product is fractionated to yield 488 g. of recovered hydrocarbon and 220 g. of acylated product having a boiling range of 136–160° C. at 1.7 mm. Hg and a woody-amber fragrance note. GLC (gas liquid phase chromatography) indicates a mixture of isomers, IR indicates the presence of a nonconjugated carbonyl, and mass spectroscopy indicates a molecular weight of 260. The ketone so produced can be represented as follows:

EXAMPLE VII

To a mixture of 900 g. of dihydro 1,5,9-trimethyl cyclododecatriene (obtained by addition of one mole of hydrogen to trimethyl cyclododecatriene using a 5% palladium on carbon catalyst at 50–75° C. and 250 lbs. pressure) and 180 g. of acetic anhydride is added dropwise a solution of 10 g. of $BF_3$-etherate in 180 g. of acetic anhydride during a period of 20 minutes while maintaining the temperature at 25° C. After the addition is completed, the mixture is stirred for another three hours at 25° C. and then worked up as in Example IV.

The crude product is fractionated to yield 657 g. recovered hydrocarbon and 146 g. of acylated product having a woody-amber fragrance and a boiling range of 130–135° C. at 2.2 mm. Hg. GLC indicates a mixture of isomers. The IR spectrum, shown in FIG. 7 as obtained on a Perkin-Elmer Model 21 instrument, indicates the presence of a nonconjugated carbonyl.

EXAMPLE VIII

To a mixture of 900 g. of tetrahydro 1,5,9-trimethyl cyclododecatrienes (form addition of two moles of hydrogen to trimethyl cyclododecatriene using Raney nickel as a catalyst at 60° C. and 250 lbs. pressure) and 180 g. of acetic anhydride is added dropwise a solution of 10 g. of $BF_3$-etherate and 180 g. of acetic anhydride over a period of 20 minutes while maintaining the temperature at 25° C. After the addition is completed, the material is held three hours at 25° C., and the reaction mass is worked up as in Example IV.

The crude product is fractionated to give 567 g. recovered hydrocarbon and 81 g. of acylated product having a woody-amber fragrance and a boiling range of 128–132° C. at 1.5 mm. Hg. GLC indicates a mixture of isomers. The IR spectrum, shown in FIG. 8 as obtained on a Perkin-Elmer Model 21 instrument, indicates the presence of a nonconjugated carbonyl.

EXAMPLE IX

Into a one-liter stainless steel stirred autoclave is placed 40 g. of the ketonic product of Example III, 125 g. isopropanol, and 5 g. Raney nickel. The mixture is hydrogenated at 500 p.s.i. and 100° C. to an uptake of one mole of $H_2$. The catalyst is filtered and the solvent stripped off.

The residual oil which tests 75% as $C_{17}$ ketone by oximation is fractionated using a small Vigreux column to obtain materials having a boiling range of 125–135° C. at 0.4 mm. Hg, GLC indicates a mixture of isomers. IR indicates a nonconjugated carbonyl (5.83μ) plus a small amount of alcohol. The product has a woody-amber odor and the IR spectrum shown in FIG. 3, as obtained with a Perkins-Elmer Model 21 instrument.

EXAMPLE X

In an analogous fashion to Example IX, 40 g. of ketonic product of Example IV is hydrogenated to an uptake of two moles of hydrogen. The crude product is distilled at 119–126° C. at 0.6 mm. Hg. GLC indicates a mixture of isomers. IR indicates a nonconjugated ketone. The product has a woody-amber fragrance and the IR spectrum shown in FIG. 4.

EXAMPLE XI

In an analogous fashion to Example IX, 40 g. of ketonic product of Example III is hydrogenated to an uptake of three moles of hydrogen. The crude product is distilled at 115–130° C. at 0.8 mm. Hg. GLC indicates a mixture of isomers. IR analysis indicates a nonconjugated ketone. The distilled product has a woody-amber fragrance and the IR spectrum shown in FIG. 5, as obtained on a Perkin-Elmer Model 21 instrument.

EXAMPLE XII

Into a 500 ml. reaction vessel equipped with stirrer, thermometer, and reflux condenser, the following ingredients are added:

200 ml. anhydrous methyl alcohol
10 g. sodium methylate
50 g. of product of Example IV The reactor contents are then heated to reflux (68° C.) for a period of six hours. To the reaction vessel is added the following:

200 ml. of water
10 ml. of acetic acid
50 ml. of toluene

After separation the organic layer is washed once with water and the toluene is stripped off. The crude product weighing 40 g. is distilled at 117–123° C. at a pressure of 0.6 mm. Hg. The yield of product is about 39 g. This product has a camphory woody-amber fragrance and the IR spectrum shown in FIG. 6, as obtained on a Perkin-Elmer Model 21 instrument. It is comprised of ketone having the structural formula

EXAMPLE XIII

A mixture of 10 grams of acetic anhydride and 6 grams of ferric chloride is prepared. A 500 ml. reaction vessel is charged with 100 grams of 1,5,9-trimethyl cyclododecatriene-1,5,9 and 35 grams of acetic anhydride. While maintaining the temperature of the reaction vessel at 10–25° C., the acetic anhydride-ferric chloride mixture is added to the reaction mass over eight hours. At the end of the eight-hour addition period, the reaction mass is mixed with 100 ml. of water and 50 ml. of toluene.

The reaction mass is then transferred to a separatory funnel and washed with 100 ml. of 5% aqueous sodium hydroxide solution and 200 ml. of water. The organic layer is separated, and this organic layer is then stripped by a flash distillation to obtain 100 grams of product.

This product has the same properties as the product of Example III.

EXAMPLE XIV 1,5,9-trimethyl cyclododecatriene-1,5,10 is prepared by reacting an equimolar mixture of piperylene and isoprene in a benzene reaction medium using a catalyst mixture comprising cromyl chloride and triethyl aluminum at a temperature of from 45–50° C. After destroying the catalyst, the mixture of these materials is distilled and the product recovered at a vapor temperature of 84–93° C. at 1.4 mm. Hg.

A one-liter reaction flask fitted with a stirrer, thermometer and addition funnel is charged with 128 grams of the above trimethyl cyclododecatrienes produced by the trimerization of piperylene-isoprene mixtures, and 50 grams of acetic acid anhydride. A solution is then prepared containing 2.4 grams boron trifluoride diethyl ether and 10 grams of acetic anhydride. This solution is also charged into the one-liter reaction flask.

The reaction mass is stirred for 4½ hours at 25° C. The mass is then added to 50 ml. of 10% aqueous sodium chloride solution and 50 ml. of toluene. The organic layer is separated from the aqueous phase and is washed with one volume of 5% aqueous sodium hydroxide solution until the mixture reaches pH 6. The organic layer is then washed with one volume of saturated aqueous sodium chloride solution. The washed product is distilled at 110° C. at 0.4 mm. Hg to recover the ketones according to this invention. The ketones have the following structures:

These structures are confirmed by infrared and NMR analysis. The product has an excellent amber-woody fragrance character similar to that of the product of Example I.

EXAMPLE XV

The following composition is prepared:

| Ingredient: | Amount (grams) |
|---|---|
| Cassia absolute | 60 |
| Methyl ionone | 60 |
| Jasmin extra | 80 |
| Neroli oil, bigarade | 60 |
| Patchouli oil | 60 |
| Vanillin | 60 |
| Violet perfume base | 60 |
| The distilled acylate of Example I | 60 |
| Lemon oil | 80 |
| Rose geranium oil | 120 |
| Lavender oil, French | 120 |
| Sweet orange oil | 80 |
| Musk extract (3%) | 50 |
| Civet extract (3%) | 50 |
| | 1000 |

The foregoing blend is tested and found to have the same desirable characteristics of richness and persistence provided by the very expensive vetivert oil and further possesses a novel woody, amber-like quality. The acylated material of Example I thus can substitute for or replace traditional materials such as sandalwood, vetivert, and patchouli.

Excellent results in the foregoing perfume compositions are also obtained utilizing the acylates prepared in Examples II to XIV in lieu of, or in admixture with, the acylate of Example I. Mixtures of these materials can also be used to good advantage in the perfume composition of Example XIII and other perfume and fragrance-modifying compositions.

Those skilled in the art will appreciate that the novel ketones prepared according to the present invention can further be treated to provide derivatives according to known reactions, and accordingly these ketones can be used as intermediates in the preparation of other useful materials. Thus the novel ketones can be treated with hydroxylamine to form oxime derivatives.

What is claimed is:

1. A monocyclic alkyl ketone having the formula wherein $R_1$ is a lower alkyl group having up to six carbon atoms, $R_2$ is methyl or methylene, said ketone having from zero to three non-conjugated carbon-carbon double bonds.

2. A monocyclic alkyl ketone having the structural formula:

wherein the dashed line is a single or a double bond, no more than one of the wavy lines is a double bond, and A represents where $R_1$ is methyl or ethyl, one of the dashed lines represents a carbon-to-carbon double bond, and the other two represent single bonds, $m$ is 0 or 1, $n$ is 1 or 2, $p$ is 2 or 3, and $m+n+p$ equals 5.

3. A monocyclic alkyl ketone having the formula wherein $R_1$ is methyl or ethyl.

4. A monocyclic alkyl ketone according to claim 3 wherein $R_1$ is methyl.

5. A monocyclic alkyl ketone according to claim 3 wherein $R_1$ is ethyl.

6. A monocyclic alkyl ketone having the formula wherein $R_1$ is methyl or ethyl.

7. A monocyclic alkyl ketone having the formula wherein $R_1$ is methyl or ethyl.

8. A monocyclic alkyl ketone having the formula wherein $R_1$ is methyl or ethyl, the dashed lines are single or double bonds, no more than one of the wavy lines is a double bond, and $p$ is 2 or 3.

9. A monocyclic alkyl ketone having the formula wherein $R_1$ is methyl or ethyl, the dashed lines are single or double bonds, no more than one of the wavy lines is a double bond, and $p$ is 2 or 3.

10. A monocyclic alkyl ketone having the formula wherein $R_1$ is a lower alkyl group having up to six carbon atoms, said ketone having three non-conjugated carbon to carbon double bonds.

11. A process for the preparation of monocyclic alkyl-lower alkyl ketones which comprises reacting trimethyl cyclododecatriene with an alkanoic acid anhydride or an alkanoic acid halide acylating agent to form acylated cyclododecatriene and recovering the acylated material.

12. The process of claim 11 wherein the acylating agent is acetic anhydride.

13. The process of claim 11 wherein the acylating agent is propionic anhydride.

14. The process of claim 11 wherein the reaction is carried out in the presence of boron trifluoride, stannic chloride, ferric chloride or zinc chloride.

15. The process of claim 11 wherein the reaction is carried out at a temperature of from about −5° C. to about 70° C.

16. The process of claim 11 wherein the acylated material is treated with an alkali-metal alkanoate isomerization agent to form a conjugated ketone.

References Cited

Nenitzescu et al., "C.A.," 1932, pp. 5923, vol. 27.
Friess et al., "C.A.," vol. 46, p. 3976a, 1951.
Hart et al., "C.A.," vol. 51, p. 9499d, 1957.

LEON ZITVER, Primary Examiner

N. MORGENSTERN, Assistant Examiner

U.S. Cl. X.R.

252—132, 522; 260—666 R, 666 P; 424—59, 65, 69, 70, 76

UNITED STATES PATENT OFFICE
CERTIFICATE OF CORRECTION

Patent No. 3,754,036     Dated August 21, 1973

Inventor(s) JACK H. BLUMENTHAL

It is certified that error appears in the above-identified patent and that said Letters Patent are hereby corrected as shown below:

Col. 1, line 16, correct the spelling of "perfume"

Col. 4, line 43, "C=O" should read -- C-O --.

Col. 4, line 58, 2nd notation under tabulation "Chemical Shift" "2.59" should read --2.50--.

Col. 5, line 41,

Col. 7, lines 65-75, correct the formula to read

Col. 8, line 30, change "acrvlate" to --acylate--

UNITED STATES PATENT OFFICE
CERTIFICATE OF CORRECTION

Patent No. 3,754,036  Dated August 21, 1973

Inventor(s) JACK H. BLUMENTHAL

It is certified that error appears in the above-identified patent and that said Letters Patent are hereby corrected as shown below:

-2-

Col. 8, lines 67-75, correct the formula to read

Col. 11, line 2, "2,5" should read --2.5--

Col. 12, line 19, "form" should read --from--.

Col. 13, lines 20-30, correct the formula to read

Signed and sealed this 27th day of November 1973.

(SEAL)
Attest:

EDWARD M. FLETCHER, JR.
Attesting Officer

RENE D. TEGTMEYER
Acting Commissioner of Patents